United States Patent
Turner et al.

(10) Patent No.: US 6,861,123 B2
(45) Date of Patent: Mar. 1, 2005

(54) SILICONE HYDROGEL CONTACT LENS

(75) Inventors: David C. Turner, Jacksonville, FL (US); Robert B. Steffen, Jacksonville Beach, FL (US); Christopher Wildsmith, Jacksonville, FL (US); Thomas A. Matiacio, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 363 days.

(21) Appl. No.: 09/727,874

(22) Filed: Dec. 1, 2000

(65) Prior Publication Data

US 2002/0099112 A1 Jul. 25, 2002

(51) Int. Cl.$^7$ ............ G02C 7/02; C08K 3/34; C08K 5/54; B32B 9/04; B32B 3/02
(52) U.S. Cl. ............ 428/156; 428/64.1; 428/64.6; 428/447; 428/451; 351/160 H; 351/160 R; 351/166; 523/106; 523/107; 524/858; 524/865; 526/279
(58) Field of Search .............. 428/64.1, 64.6, 428/447, 451, 156; 351/160 H, 160 R, 166; 523/106, 107; 526/279; 524/858, 865

(56) References Cited

U.S. PATENT DOCUMENTS

| | | |
|---|---|---|
| 3,808,178 A | 4/1974 | Gaylord |
| 4,136,250 A | 1/1979 | Mueller et al. |
| 4,139,513 A | 2/1979 | Tanaka et al. |
| 4,153,641 A | 5/1979 | Deichert et al. |
| 4,182,822 A | 1/1980 | Chang |
| 4,189,546 A | 2/1980 | Deichert et al. |
| 4,254,248 A | 3/1981 | Friends et al. |
| 4,259,467 A | 3/1981 | Keough et al. |
| 4,260,725 A | 4/1981 | Keogh et al. |
| 4,261,875 A | 4/1981 | Le Boeuf |
| 4,276,402 A | 6/1981 | Chromecek et al. |
| 4,327,203 A | 4/1982 | Deichert et al. |
| 4,341,889 A | 7/1982 | Deichert et al. |
| 4,343,927 A | 8/1982 | Chang |
| 4,355,148 A | 10/1982 | Layer et al. |
| 4,463,149 A * | 7/1984 | Ellis ............ 526/279 |
| 4,486,577 A | 12/1984 | Mueller et al. |
| 4,543,398 A | 9/1985 | Bany et al. |
| 4,605,712 A | 8/1986 | Mueller et al. |
| 4,661,575 A | 4/1987 | Tom |
| 4,680,336 A | 7/1987 | Larsen et al. |
| 4,681,295 A | 7/1987 | Haardt et al. |
| 4,703,097 A | 10/1987 | Wingler et al. |
| 4,837,289 A | 6/1989 | Mueller |
| 4,871,785 A | 10/1989 | Froix |
| 4,889,664 A | 12/1989 | Kindt-Larsen et al. |
| 4,920,184 A | 4/1990 | Schafer et al. |
| 4,954,586 A | 9/1990 | Toyoshima et al. |
| 4,954,587 A | 9/1990 | Mueller |
| 4,995,313 A | 2/1991 | Delau et al. |
| 5,010,141 A | 4/1991 | Mueller |
| 5,034,467 A | 7/1991 | White |
| 5,039,459 A | 8/1991 | Kindt-Larsen et al. |
| 5,057,578 A | 10/1991 | Spinelli |
| 5,070,215 A | 12/1991 | Bambury et al. |
| 5,314,960 A | 5/1994 | Spinelli |
| 5,314,961 A * | 5/1994 | Anton et al. ............ 525/280 |
| 5,346,946 A | 9/1994 | Yokoyama et al. |
| 5,358,995 A | 10/1994 | Lai et al. |
| 5,371,147 A | 12/1994 | Spinelli et al. |
| 5,387,632 A | 2/1995 | Lai |
| 5,451,617 A | 9/1995 | Lai et al. |
| 5,486,579 A | 1/1996 | Lai et al. |
| 5,539,016 A * | 7/1996 | Kunzler et al. ............ 523/107 |
| 5,702,735 A | 12/1997 | Martin et al. |
| 5,710,302 A | 1/1998 | Kunzler et al. |
| 5,712,327 A | 1/1998 | Chang et al. |
| 5,714,557 A | 2/1998 | Kunzler et al. |
| 5,760,100 A | 6/1998 | Nicolson et al. |
| 5,776,999 A | 7/1998 | Nicolson et al. |
| 5,789,461 A | 8/1998 | Nicolson et al. |
| 5,807,944 A | 9/1998 | Hirt et al. |
| 5,849,811 A * | 12/1998 | Nicolson et al. ............ 523/106 |
| 5,908,906 A | 6/1999 | Kunzler et al. |
| 5,923,397 A * | 7/1999 | Bonafini, Jr. ............ 351/160 R |
| 5,951,934 A | 9/1999 | Wickes et al. |
| 5,958,440 A | 9/1999 | Burrell et al. |
| 5,962,548 A | 10/1999 | Vanderlaan et al. |
| 5,965,631 A | 10/1999 | Nicolson et al. |
| 5,981,615 A | 11/1999 | Meijs et al. |
| 5,981,675 A | 11/1999 | Valint, Jr. et al. |
| 5,998,498 A | 12/1999 | Vanderlaan et al. |
| 6,039,913 A | 3/2000 | Hirt et al. |
| 6,367,929 B1 * | 4/2002 | Maiden et al. ............ 351/160 H |

FOREIGN PATENT DOCUMENTS

| | | |
|---|---|---|
| DE | 199 00 492 A1 | 7/2000 |
| EP | 0 940 693 A2 | 9/1999 |

OTHER PUBLICATIONS

PCT International Search Report, dated Dec. 5, 2002, for PCT Int'l. Appln. No. PCT/US01/51606.

* cited by examiner

Primary Examiner—Harold Pyon
Assistant Examiner—Catherine A. Simone

(57) ABSTRACT

The invention provides molds and mold inserts useful in the production of contact lenses. In particular, the invention provides high optical quality molds and inserts useful for manufacturing silicone hydrogel contact lenses.

10 Claims, No Drawings

SILICONE HYDROGEL CONTACT LENS

FIELD OF THE INVENTION

The present invention relates to molds and mold inserts useful in the production of contact lenses. In particular, the invention provides high optical quality molds and mold inserts for use in the manufacture of silicone hydrogel contact lenses.

BACKGROUND OF THE INVENTION

The use of soft contact lenses for reasons of cosmetics and for the correction of visual acuity is well known. Typically, these lenses are manufactured by casting. The mold halves used in the casting of the lenses are produced by first machining metallic inserts and then using the inserts to produce the mold halves. The process of machining the inserts may cause periodic defects, or periodic structures, that may be transferred to the mold halves. The molding surfaces of the mold halves are adequate to produce optical quality lenses for conventional hydrogel lenses cast in the mold halves.

However, in the cast molding of silicone hydrogel lenses, the silicone hydrogel materials precisely replicate the mold surface. Thus, periodic structures on the mold surface are transposed onto the lens' surface. If the lens is coated with a swellable, or hydrophilic coating, the swelling of the coating magnifies these surface defects. These magnified defects may compromise the lens wearer's vision by generating coherent scattering (prismatic effect) or tool marks visible to the eye care practitioner. Thus, the molds may produce coated silicone hydrogel lenses with surfaces of less than optical quality. Therefore, a need exists for a method and materials to overcome this problem.

DESCRIPTION OF THE INVENTION AND ITS PREFERRED EMBODIMENTS

The present invention provides molds useful for cast molding silicone hydrogel contact lenses, inserts for producing the molds, and lenses made using the molds of the invention. The molds of the invention have molding surfaces on which periodic structures, resulting from the machining of the insert that forms the mold, are of an amplitude and a periodicity less than that that results in production of optical defects on the lens surface that, when the lens is coated, will affect the wearer's vision.

In one embodiment, the invention provides a lens insert comprising, consisting essentially of, and consisting of at least one optically critical surface, wherein periodic structures on the optically critical surface are of a periodicity of less than about 3 $\mu$m and an amplitude of less than about 4 nm RMS. In another embodiment, the invention provides a mold half for use in molding a contact lens, the mold half comprising, consisting essentially of, and consisting of at least one molding surface, wherein periodic structures on the molding surface are of a periodicity of less than about 3 $\mu$m and an amplitude of less than about 4 nm RMS. In yet another embodiment, the invention provides a silicone hydrogel contact lens comprising, consisting essentially of, and consisting of at least one surface wherein periodic structures on the surface are of a periodicity of less than about 3 $\mu$m and an amplitude of less than about 4 nm RMS. For purposes of the invention, the amplitude measurement is made over a 50×50 $\mu$m area using Atomic Force Microscopy.

By "optically critical surface" is meant the surface of the mold insert used to produce the molding surface of a lens mold or mold half. By "molding surface' is meant the surface of a mold or mold half used to form a surface of a lens.

The optically critical surface of the inserts of the invention are preferably polished to randomize the surface structures and reduce the roughness to the desired levels. The inserts are first produced by any convenient method including, without limitation, by single, diamond point turning of a suitable material. Typically, the inserts are shaped using a controlled-waviness, diamond cutting tool with as many as two finish cuts using the same tool. One ordinarily skilled in the art will recognize that a controlled-waviness tool is a tool that, no matter at what point on the cutting portion of the tool the cut is made, the radius at that point is that specified by the tool maker, within tolerances, with only minimal, local deviations. Such a tool provides that the final part cut will be extremely accurate. The tool nose radii may range from about 100 to 250 micrometers.

Polishing of the inserts to provide the optically critical surfaces of the invention may be carried out by any convenient method. Preferably, polishing is performed by using a heavy carbon diamond polishing compound applied to a cloth and a jig shaped to match the insert radius. The insert and jig are placed into the polisher for an appropriate amount of time, for example about one minute, and then removed and swabbed with a suitable solvent, such as an alcohol, to remove the polishing compound. The insert is then inspected and the process repeated as necessary. The insert is finally inspected by any convenient method including, without limitation, by use of an interferometer, to ensure that the radius meets the design specifications and that the periodic structures are of the desired periodicity and amplitude.

As an alternative to polishing, lathing using conditions suitable to produce the optically critical surfaces of the invention are selected so that amplitude and periodicity of the periodic structures are within the desired limits. For example, the ratio of linear feed rate, or the rate at which the diamond tool tracks across the surface of the part measured in mm/min, to the spindle speed in rev./min is used that is sufficient to provide the desired increment between each lathe line or spiral. To obtain lathe lines at 1 micron intervals, one uses 5 mm/min linear feed and 5,000 rpm, 10 mm/min linear feed and 10,000 rpm, or any figures that provide the ratio of 1/1000. To obtain lathe lines less than 300 nm apart, the appropriate ratio to be used is 3/10000 or a linear feed of 2.4 mm/min with a spindle speed of 8000 rpm.

The inserts of the invention may be constructed of any material that can be made with an optical finish including, without limitation, metal, quartz, ceramic, polymers, and the like. Suitable metals include, without limitation, pure steel, brass, copper, nickel-plated substrates, chromium, cobalt-nickel, alloyed martensitic steel, AMPCOLOY™ substrates, and the like, and combinations thereof Preferably, the inserts are nickel-plated copper or nickel-plated brass. Examples of useful polymer materials include, without limitation, polycarbonates, cycloolefins, nylon, DELRIN®, TEFLON®, polystyrene, polypropylene, poly(acrylonitrile), and the like, and combinations thereof.

The inserts are used to form the molds or mold halves of the invention using any known method. Generally, the molds are cast from the inserts. Typically, an insert suitable for forming the molding surface of the mold or mold half will be paired with a complementary insert to be used to form the non-molding surface of the mold or mold half. The molds of the invention may be made from any material suitable for use in the production of contact lenses. Suitable mold materials include, without limitation, polyolefins such as polypropylene, polystyrene, and cyclic polyolefins, polyacrylonitrile materials and the like, and combinations thereof.

The molds and inserts of the invention may be used to produce any type of silicone hydrogel lens. The lenses of the invention are silicone hydrogel lenses, preferably silicone hydrogel lenses coated with a swellable coating. Suitable silicone hydrogel materials include, without limitation, silicone hydrogels made from silicone macromers such as the polydimethylsiloxane methacrylated with pendant hydrophilic groups described in U.S. Pat. Nos. 4,259,467; 4,260,725 and 4,261,875; or the polydimethylsiloxane macromers with polymerizable functional described in U.S. Pat. Nos. 4,136,250; 4,153,641; 4,189,546; 4,182,822; 4,343,927; 4,254,248; 4,355,147; 4,276,402; 4,327,203; 4,341,889; 4,486,577; 4,605,712; 4,543,398; 4,661,575; 4,703,097; 4,837,289; 4,954,586; 4,954,587; 5,346,946; 5,358,995; 5,387,632; 5,451,617; 5,486,579; 5,962,548; 5,981,615; 5,981,675; and 6,039,913. They may also be made using polysiloxane macromers incorporating hydrophilic monomers such as those described in U.S. Pat. Nos. 5,010,141; 5,057,578; 5,314,960; 5,371,147 and 5,336,797; or macromers comprising polydimethylsiloxane blocks and polyether blocks such as those described in U.S. Pat. Nos. 4,871,785 and 5,034,461. All of the cited patents are hereby incorporated in their entireties by reference.

Suitable materials may also be made from combinations of oxyperm and ionoperm components such as is described in U.S. Pat. Nos. 5,760,100; 5,776,999; 5,789,461; 5,807,944; 5,965,631 and 5,958,440. Hydrophilic monomers may be incorporated into such copolymers, including 2-hydroxyethyl methacrylate, 2-hydroxyethyl acrylate "HEMA"), N,N-dimethylacrylamide ("DMA"), N-vinylpyrrolidone, 2-vinyl-4,4'-dimethyl-2-oxazolin-5-one, methacrylic acid, 2-hydroxyethyl methacrylamide. Additional siloxane monomers may be incorporated such as tris(trimethylsiloxy)silylpropyl methacrylate, or the siloxane monomers described in U.S. Pat. Nos. 5,998,498; 3,808,178; 4,139,513; 5,070,215; 5,710,302; 5,714,557 and 5,908,906. They may also include various toughening agents, tints, UV blockers and wetting agents. They can be made using diluents such as primary alcohols, or the secondary or tertiary alcohols described in U.S. Pat. No. 6,020,445. All of the cited patents are hereby incorporated in their entireties by reference.

In a preferred embodiment, the lenses of the invention are made by reacting a macromer with a reaction mixture that includes silicone based monomers and hydrophilic monomers. The macromers may be made by combining a methacrylate or an acrylate and a silicone in the presence of a Group Transfer Polymerization ("GTP") catalyst. These macromers typically are copolymers of various monomers. They may be formed in such a way that the monomers come together in distinct blocks, or in a generally random distribution. These macromers may furthermore be linear, branched, or star shaped. Branched structures are formed for instance if polymethacrylates, or crosslinkable monomers such as 3-(trimethylsiloxy)propyl methacrylate are included in the macromer.

Initiators, reaction conditions, monomers, and catalysts that can be used to make GTP polymers are described in "Group-Transfer Polymerization" by O. W. Webster, in Encyclopedia of Polymer Science and Engineering Ed. (John Wiley & Sons) p. 580, 1987. These polymerizations are conducted under anhydrous conditions. Hydroxyl-functional monomers, like HEMA, may be incorporated as their trimethylsiloxy esters, with hydrolysis to form free hydroxyl groups after polymerization. GTP offers the ability to assemble macromers with control over molecular weight distribution and monomer distribution on the chains. This macromer may then be reacted with a reaction mixture of predominantly polydimethylsiloxane (preferably, monomethacryloxypropyl terminated polydimethylsiloxane ("mPDMS"), and hydrophilic monomers. Preferred mPDMS is of the formula:

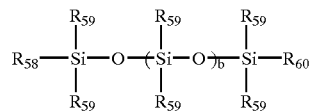

wherein b=0 to 100, preferably 8 to 10; $R_{58}$ is a monovalent group containing a ethylenically unsaturated moiety, preferably a monovalent group containing a styryl, vinyl, or methacrylate moiety, more preferably a methacrylate moiety; each $R_{59}$ is independently a monovalent alkyl, or aryl group, which may be further substituted with alcohol, amine, ketone, carboxylic acid or ether groups, preferably unsubstituted monovalent alkyl or aryl groups, more preferably methyl; and $R_{60}$ is a monovalent alkyl, or aryl group, which may be further substituted with alcohol, amine, ketone, carboxylic acid or ether groups, preferably unsubstituted monovalent alkyl or aryl groups, preferably a $C_{1-10}$ aliphatic or aromatic group which may include hetero atoms, more preferably $C_{3-8}$ alkyl groups, most preferably butyl, particularly sec-butyl group.

Preferred macromer components include mPDMS, 3-methacryloxypropyltris (trimethylsiloxy) silane ("TRIS"), methyl methacrylate, HEMA, DMA, methacrylonitrile, ethyl methacrylate, butyl methacrylate, 2-hydroxypropyl-1-methacrylate, 2-hydroxyethyl methacrylamide and methacrylic acid. It is even more preferred that the macromer is made from a reaction mixture of that HEMA, methyl methacrylate, TRIS, and mPDMS. It is most preferred that macromer is made from a reaction mixture comprising, consisting essentially of, or consisting of about 19.1 moles of the HEMA, about 2.8 moles of methyl methacrylate, about 7.9 moles of TRIS, and about 3.3 moles of monomethacryloxypropyl terminated mono-butyl terminated polydimethylsiloxane, and is completed by reacting the aforementioned material with about 2.0 moles per mole of 3-isopropenyl-ω,ω-dimethylbenzyl isocyanate using dibutyltin dilaurate as a catalyst.

The reactive components of silicone hydrogels typically are a combination of hydrophobic silicone with very hydrophilic components. Because these components are often immiscible due to their differences in polarity, it is particularly advantageous to incorporate a combination of hydrophobic silicone monomers with hydrophilic monomers, especially those with hydroxyl groups, into the macromer. The macromer can then serve to compatibilize the additional silicone and hydrophilic monomers that are incorporated in the final reaction mixture. These blends typically also contain diluents to further compatibilize and solubilize all components. Preferably, the silicone based hydrogels are made by reacting the following monomer mix: macromer; an $Si_{7-9}$ monomethacryloxy terminated polydimethyl siloxane; and hydrophilic monomers together with minor amounts of additives and photoinitiators. It is more preferred that the hydrogels are made by reacting macromer; an $Si_{7-9}$ monomethacryloxy terminated polydimethyl siloxane; TRIS; DMA; HEMA; and tetraethyleneglycol dimethacrylate ("TEGDMA"). It is most preferred that the hydrogels are made from the reaction of (all amounts are calculated as weight percent of the total weight of the combination) macromer (about 18%); an $Si_{7-9}$ monomethacryloxy terminated polydimethyl siloxane (about 28%); TRIS (about 14%); DMA (about 26%); HEMA (about 5%); TEGDMA (about 1%), polyvinylpyrrolidone ("PVP") (about 5%); with the balance comprising minor amounts of additives and photoinitiators, and that the reaction is conducted in the presence of 20% wt dimethyl-3-octanol diluent.

The lenses' surfaces may be coated with a swellable coating by any convenient method such as by application of a suitable hydrophilic coating. The coatings may be applied by any convenient method. Preferred hydrophilic coatings include, without limitation, poly(acrylic acid), poly (methacrylic acid), poly(maleic acid), poly(itaconic acid), poly(acrylamide), poly(dimethacrylamide), block or random copolymers of (meth)acrylic acid, acrylic acid, maleic acid, itaconic acid with any reactive vinyl monomer, carboxymethylated polymers, such as carboxymethylcellulose, dextran, polyvinyl alcohol, polyethylene oxide, poly (HEMA), polysulfonates, polysulfates, polylactam, polyglycolic acid, polyamines, and the like, and mixtures thereof More preferably, the coating is poly(acrylic acid), poly (methacrylic acid), poly(dimeth)acrylamide, poly (acrylamide), or poly(HEMA). Most preferably, poly (acrylic acid), poly(acrylamide), or poly(HEMA) is used.

The lenses of the invention may be made using any known process for contact lens production. Preferably, the lenses are made by photocuring the lens composition and applying a coating to the cured lens. Various processes are known for molding the reaction mixture in the production of contact lenses, including spincasting and static casting. The preferred method for producing contact lenses of this invention is by the direct molding of the silicone hydrogels, which is economical, and enables precise control over the final shape of the hydrated lens. For this method, the reaction mixture is placed in a mold having the shape of the final desired silicone hydrogel, i.e. water-swollen polymer, and the reaction mixture is subjected to conditions whereby the monomers polymerize, to produce a polymer in the approximate shape of the final desired product. The conditions for such polymerization are well known in the art. The polymer mixture optionally may be treated with a solvent and then water, producing a silicone hydrogel having a final size and shape similar to the size and shape of the original molded polymer article. This method can be used to form contact lenses and is further described in U.S. Pat. Nos. 4,495,313, 4,680,336, 4,889,664 and 5,039,459 incorporated herein by reference in their entireties.

The invention will be clarified further by consideration of the following, non-limiting examples.

EXAMPLES 1–18

Insert and Mold Fabrication

Inserts were fabricated from brass by diamond point turning using a controlled waviness tool nose. Unless otherwise noted, all brass inserts were cut with 4 semi-finished cuts, cutting depth=0.25 mm, at a spindle speed of 8,000 rpm and feed rate of 25 mm/min. The inserts then were cut, cutting depth=0.005 mm, at a spindle speed of 8,000 rpm and feed rate of 5 mm/min. The inserts then were: 1.) untreated; 2.) treated with a thin nickel coating of approximately 2–4 µm applied to the insert surface by evaporation; 3.) treated with a thick nickel coating of approximately 100–200 µm applied to the insert surface by evaporation; or 4.) polished using diamond polishing paste.

For examples 1–18, lens mold halves were injection molded from TOPAS® polymer using the inserts listed on the Table below. The inserts were installed into an 8-cavity injection mold and molten TOPAS®, at approximately 290–300° C., injected into the mold under pressure. The pressure was relieved, the molds allowed to cool, opened, and the molds ejected.

Lens Formation—Examples 1–18

Macromer for use in producing lenses was prepared by adding 191.75 g 1-trimethylsiloxy-1-methoxy-2-, ethylpropene to a 13.75 ml of a 1M solution of tetrabutyl ammonium-m-chlorobenzoate ("TBACB") in tetrahydrofuran ("THF"), 30.0 g bis(dimethylamino)methylsilane, 61.39 g p-xylene, 154.28 g methyl methacrylate, and 1892.13 g 2-(trimethylsiloxy)ethyl methacrylate in 4399.78 g THF at 14° C. under a nitrogen atmosphere. 30 ml of additional TBACB in THF (0.40 M) were added over a period of 260 minutes, during which time the reaction mixture was allowed to exotherm, and then cooled to 30° C. Sixty minutes after addition of 2-(trimethylsiloxy)ethyl methacrylate, a solution of 467.56 g 2-(trimethylsiloxy)ethyl methacrylate, 3636.6 g mPDMS and 3673.84 g TRIS and 20.0 g bis(dimethylamino)methylsilane was added, and the mixture was allowed to exotherm and then cooled to 30° C. for 2 hours. A solution of 10.0 g bis(dimethylamino) methylsilane, 154.26 g methyl methacrylate, and 1892.13 g 2-(trimethylsiloxy)ethyl methacrylate was then added and the mixture was again allowed to exotherm. After 2 hours, 2 gallons of anhydrous THF was added, followed by a solution of 439.69 g water, 740.6 g methanol and 8.8 g dichloroacetic acid after the solution was allowed to cool down to 34° C. The mixture was refluxed for 4.5 hours, heating with an oil bath at110° C., and volatiles were distilled off at 135° C., with addition of toluene to aid in removal of water, until a vapor temperature of 110° C. is reached.

The reaction flask was cooled to 110° C., and a solution of 443 g dimethyl meta-isopropenyl benzyl isocyanate and 5.7 g dibutyltin dilaurate was added. The mixture was reacted for 3.5 hours, then cooled to 30° C. The toluene was evaporated under reduced pressure to yield off-white, anhydrous, waxy, reactive macromer.

Silicone hydrogel lenses were made using a mixture of the macromer with the following: 14 wt percent TRIS; 26 wt percent DMA; 28 wt percent mPDMS; 2 wt percent NORBLOC™; 1 wt percent TEGDMA; 5 wt percent HEMA; and 8 wt percent PVP, along with minor amounts of additives and diluents. The following procedure was used to form lenses.

Contact lenses were formed by adding approximately 0.10 g of the lens material to TOPAS® mold cavities and the material was cured for approximately 1200 sec. Polymerization was carried out under a nitrogen purge and was photointiated with 5 mW $cm^2$ of ultraviolet light generated with an Andover Corp. 420PS10-25 AM39565-02 light filter. After curing was completed, the molds were opened, the lenses released into a 1:1 blend of water and isopropanol, and leached in isopropanol to remove residual monomers and diluent. The lenses were equilibrated in physiological borate-buffered saline. Coated lenses were prepared by immersing the leached lenses in a solution of 1.0% of 250,000 MW poly(acrylic acid) in borate-buffered saline at 45° C. to which 0.1% of 1-[3-(dimethylamino)propyl]-3- ethylcarbodiimide hydrochloride was added. After stirring for approximately 30 min the lenses were rinsed in borate-buffered saline solution.

Lens Testing

In vitro tool marks were determined for all lenses by blotting each lens dry and placing the lens on a steel, 44.75D (7.55 mm radius) keratometer calibration standard and using a Zeiss slit lamp (Model 30SL/M with power supply 31 04 58) with 16–40× magnification at maximum illumination to look for the presence or absence of tool marks. In addition to the lenses for Examples 1–18, examples 19 and 20, FOCUS® NIGHT & DAY daily wear lens made of lotrafilcon A, uncoated and coated, respectively, with poly(acrylic acid) were tested. The following table lists the results of the study.

| Example | Lens Power (D) | Insert/Lens | Lens Tool Mark/Primsatic Effect Rate |
|---|---|---|---|
| 1 | −4.00 | Polished brass/PAA coated | 0% (0/5) |
| 2 | −2.50 | Unpolished brass/PAA coated | 60% (3/5) |
| 3 | −2.50 | Polished brass/PAA coated | 0% (0/5) |
| 4 | −2.00 | Unpolished brass/PAA coated | 100% (5/5) |
| 5 | −2.00 | Polished brass/PAA coated | 0% (0/5) |
| 6 | −2.50 | Unpolished brass/PAA coated | 60% (3/5) |
| 7 | −2.50 | Polished brass/PAA coated | 0% (0/5) |
| 8 | −4.00 | Unpolished brass/PAA coated | 100% (5/5) |
| 9 | −2.50 | Thin Ni coated brass/PAA coated | 100% (5/5) |
| 10 | −4.00 | Thin Ni coated brass/PAA coated | 100% (5/5) |
| 11 | −2.50 | Thick Ni coated brass/PAA coated | 100% (10/10) |
| 12 | −4.00 | Thick NI coated brass/PAA coated | 14% (117) |
| 13 | −2.50 | Polished brass/PAA coated | 100% (10/10) |
| 14 | −4.00 | Polished brass/PAA coated | 0% (0/10) |
| 15 | −4.00 | Unpolished Brass Tooling feed speed 7.5 mm/min @ 5000 rpm/Uncoated | 0% (0/5) |
| 16 | −4.00 | Unpolished Brass Tooling feed speed 7.5 mm/min @ 5000 rpm/PAA Coated | 100% (10/10) |
| 17 | −4.00 | Unpolished Brass Tooling feed speed 5 mm/min @ 8000 rpm/Uncoated | 0% (0/5) |
| 18 | −4.00 | Unpolished Brass Tooling feed speed 5 mm/min @ 8000 rpm/PAA Coated Uncoated | 100% (10/10) |
| 19 | −1.00 | | 0% (0/2) |
| 20 | −1.00 | PAA Coated | 50% (1/2) |

What is claimed is:

1. A silicone hydrogel contact lens, comprising at least one surface wherein periodic structures on the surface are of a periodicity of less than about 3 μm and an amplitude of less than about 4 nm RMS.

2. The silicone hydrogel lens of claim 1, wherein the at least one surface further comprises a hydrophilic coating.

3. The silicone hydrogel lens of claim 2, wherein the hydrophilic coating is selected from the group consisting of poly(acrylic acid), poly(methacrylic acid), poly(dimeth)acrylamide, poly(acrylamide), or poly(hydroxyethylmethacrylate).

4. The silicone hydrogel lens of claim 2, wherein the hydrophilic coating is poly(acrylic acid).

5. The silicone hydrogel lens of claim 2, wherein the hydrophilic coating is poly(acrylamide).

6. The silicone hydrogel lens of claim 2, wherein the hydrophilic coating is poly(hydroxyethylmethacrylate).

7. The silicone hydrogel lens of claim 1, wherein the silicone hydrogel comprises a Group Transfer Polymerization product of a reaction mixture comprising 2-hydroxyethyl methacrylate, methyl methacrylate, methacryloxypropyltris(trimethylsiloxy)silane, and mono-methacryloxypropyl terminated mono-butyl terminated polydimethylsiloxane and a polymerizable mixture comprising a $Si_{7-9}$ monomethacryloxy terminated polydimethyl siloxane; a methacryloxypropyl tris(trimethyl siloxy) silane; N,N-dimethyl acrylamide; 2-hydroxy ethyl methacrylate; and tetraethyleneglycol dimethacrylate.

8. The silicone hydrogel lens of claim 2, wherein the silicone hydrogel comprises a Group Transfer Polymerization product of a reaction mixture comprising 2-hydroxyethyl methacrylate, methyl methacrylate, methacryloxypropyltris(trimethylsiloxy)silane, and mono-methacryloxypropyl terminated mono-butyl terminated polydimethylsiloxane and a polymerizable mixture comprising a $Si_{7-9}$ monomethacryloxy terminated polydimethyl siloxane; a methacryloxypropyl tris(trimethyl siloxy) silane; N,N-dimethyl acrylamide; 2-hydroxy ethyl methacrylate; and tetraethyleneglycol dimethacrylate.

9. The silicone hydrogel lens of claim 1, wherein the silicone hydrogel comprises a fluorosiloxane hydrogel.

10. The silicone hydrogel lens of claim 2, wherein the silicone hydrogel comprises a fluorosiloxane hydrogel.

* * * * *